Jan. 3, 1950  C. S. KASPER  2,493,147
WORK CHECKING MACHINE
Filed Sept. 22, 1944  3 Sheets-Sheet 1

INVENTOR.
Cass S. Kasper.
BY
Harness, Dickey & Pierce
ATTORNEYS.

Jan. 3, 1950 C. S. KASPER 2,493,147
WORK CHECKING MACHINE
Filed Sept. 22, 1944 3 Sheets-Sheet 2

INVENTOR.
Cass S. Kasper.
BY
Harness, Dickey & Pierce.
ATTORNEYS.

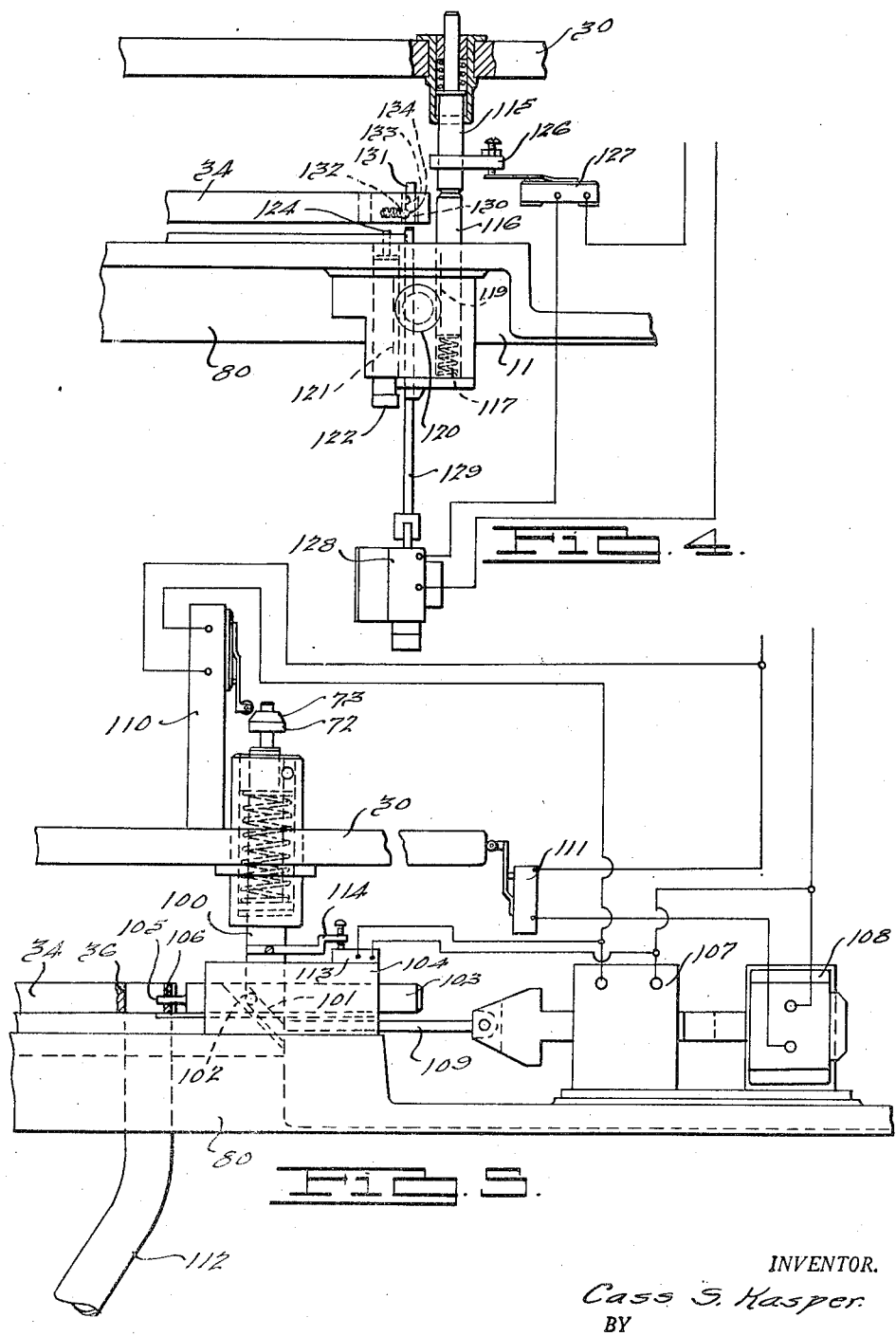

Patented Jan. 3, 1950

2,493,147

UNITED STATES PATENT OFFICE 2,493,147

WORK CHECKING MACHINE

Cass S. Kasper, Grosse Pointe, Mich.

Application September 22, 1944, Serial No. 555,251

4 Claims. (Cl. 209—88)

The invention relates to apparatus for checking the dimensions of manufactured articles such, for instance, as screw machine products.

While the invention is applicable to many different types of articles produced through manufacturing operations, it is particularly useful in checking dimensions of articles produced in large volume wherein several different dimensions must be checked to determine if the article is satisfactory or sufficiently accurate. Where such articles are produced in large volume, the problem of checking the dimensions and doing it rapidly is rather critical since manual checking requires considerable time and is not consistently satisfactory, and the cost may be substantial compared to the cost of manufacturing the piece. Constant manual checking also introduces errors since the checking becomes tedious and if it is done rapidly some carelessness almost always occurs.

A principal object of the present invention is to provide an improved and efficient apparatus for checking dimensions of a piece of work and accomplishing this result rapidly and with precision so as to not only secure more uniform and satisfactory results but also to reduce the cost of checking.

Another object of the invention is to provide apparatus for checking several different dimensions of manufactured pieces of work and for doing this automatically.

Another object of the invention is to provide apparatus such as last indicated wherein the piece of work is automatically rejected or removed from the machine if the piece of work has one or more erroneous dimensions.

Another object of the invention is to provide apparatus such as above described wherein the rejected pieces of work are discharged and simultaneously segregated into groups according to the inaccuracies or faulty dimensions so that the work of correcting the faulty pieces, if possible, is simplified.

And, in general, it is an object of the invention to provide apparatus for checking or testing dimensions of pieces of work which will accomplish this result more accurately and more uniformly to the end that a cheaper and more precise product may be furnished.

Other objects of the invention will become apparent from the following description, from the drawings to which it relates and from the claims hereinafter set forth.

For a better understanding of the invention reference may be had to the accompanying drawings wherein:

Fig. 4 is a fragmentary view of one operating stage in the mechanism;

Fig. 5 is a similar fragmentary view illustrating another stage of operation.

Figure 1:
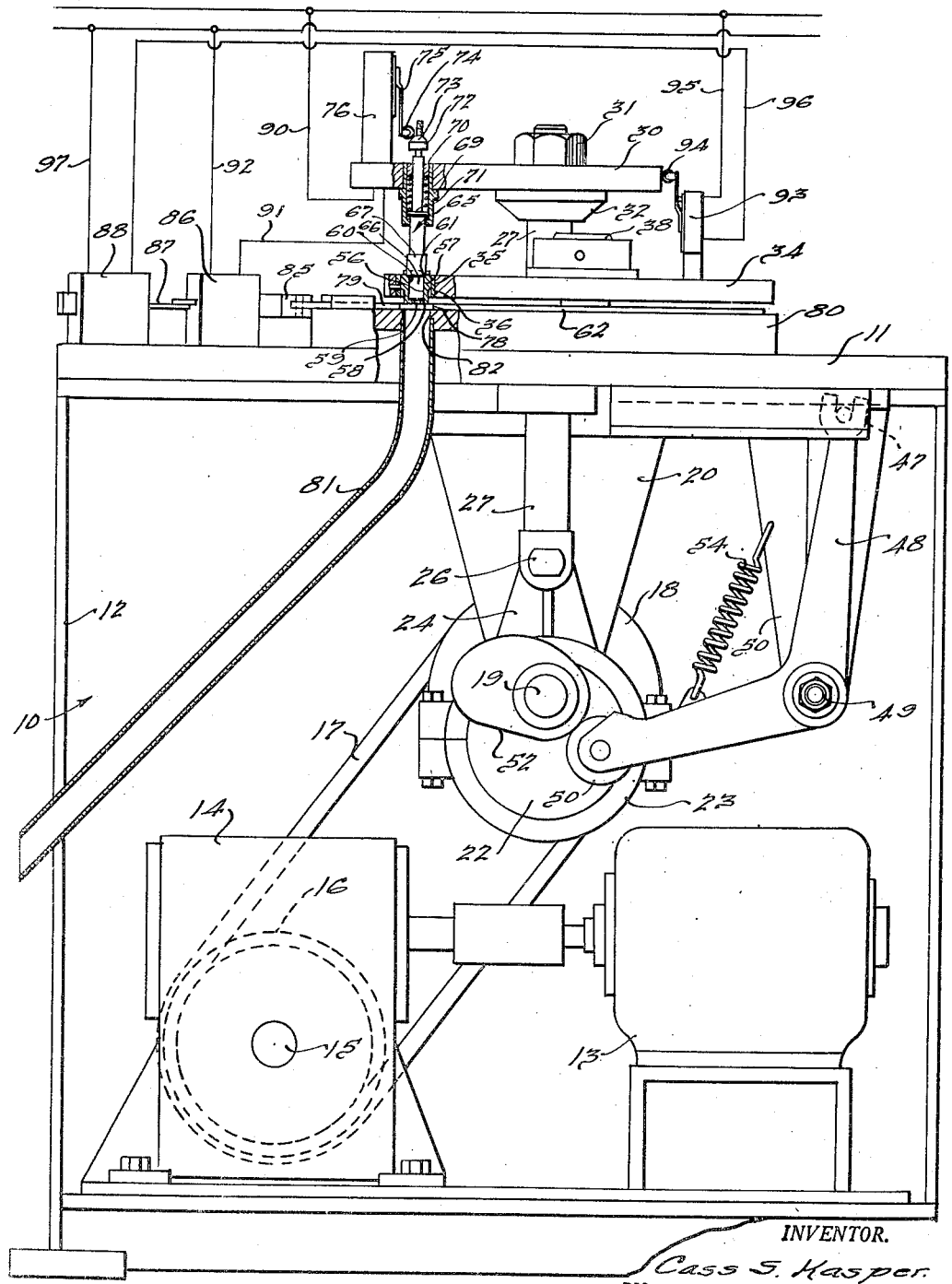
Figure 1 is a vertical view partly in section illustrating mechanism as constructed according to one form of the invention.

Referring to Fig. 1, the machine illustrated generally comprises a base 10 having a top 11 and side walls 12. Within the base, a motor 13 is provided and this is connected to a reduction gearing 14 which in turn has a shaft 15 provided with a pulley 16. A belt trained about the pulley 16 in turn is trained about a second pulley 18 secured to a shaft 19 and the latter in turn may be suitably supported in bearing brackets 20 depending from the top 11. An eccentric 22, mounted to turn with the shaft 19, turns within an eccentric ring 23 and this ring forms part of a crank 24. At its upper end, the crank is pivotally connected, as indicated at 26, to a vertically reciprocatory post 27. A second post 28 is also provided and is connected to a similar crank and eccentric driven by shaft 19 and both posts extend through the top 11, as seen in both Figs. 1 and 2, and substantially above it. At their upper ends, the posts 27 and 28 pass through a plate 30 and nuts 31 on the upper ends of the posts in conjunction with collars 32 on the posts at the underside of the plate firmly anchor the plate in position. Hence, when the posts 27 and 28 are vertically reciprocated, the plate 30 is vertically reciprocated. In general, it may be stated at this time, that the plate 30 carries work checking means and that during downward movement of the plate, different dimensions on workpieces are checked and when the plate is raised, the workpieces are moved to new positions so that different dimensions may be checked in sequence.

The pieces of work, which in this instance may be screw machine products, are adapted to be carried by a circular disc 34 having a series of circular openings 35 for receiving the workpieces. Each of these openings may have a hard metal liner 36 fixed therein and in this connection it is evident that by replacing the liner, different sizes of workpieces may be accommodated. The disc 34 is fastened to a central shaft 38 which projects downwardly through the top 11 and is suitably journaled in bearings secured to the top so that the disc will turn about the axis of the shaft. Below the top, as seen best by Fig. 2, the shaft 38 is connected to a ratchet wheel 40, and the teeth of the wheel are adapted to be engaged by a pawl 41 which is pivoted, as indicated at 42, to a slide 43 on the underside of the top. A spring 44, normally urges the pawl into tooth engaging position, while allowing the pawl to have an idle return movement. At its end opposite the pawl, the slide 43 has a slot 45 and a pin 46 and this pin, as best shown by Fig. 1, is engaged by a bifurcated end 47 of a bell crank 48. The bell crank is pivoted, as indicated at 49, to a bracket 50 hanging from the top 11 and at its end opposite the bifurcation 47, the bell crank has a roller 50 which contacts a cam 52 secured to the shaft 19. A spring 54 connected to the bell crank and to the bracket 50 normally holds the roller in contact with the cam.

The cam 52 and the eccentric 22 are so arranged and designed that during the upward movement of the plate 30 or rather during the upper part of the upward movement of the plate, the bell crank 48 is moved so as to cause the disc 34 to index circumferentially to the next position. During the major and final downward movement of the plate 30 the work supporting disc 34 is, of course, stationary.

A piece of work to be tested is shown in Fig. 1, at 56, and generally is in the forming a bushing having a side wall 57 and a bottom wall 58 having an opening 59 at its center. The bushing shown has two inside diameters indicated at 60 and 61, respectively. Each workpiece substantially but slidably fits the opening in liner 36 and rests on a fixed plate 62 disposed beneath the disc 34. Hence, as the disc turns or indexes, the piece of work will slide on the plate 62.

Before describing specifically the mechanism for checking particular dimensions of the workpiece and causing unsatisfactory pieces to be rejected, it seems advisable to briefly refer to the manner in which the machine operates. An operator of the machine loads the disc at one point, or, in other words, he places the workpiece in the openings in the disc 34 and does this as each opening reaches a certain point. When any one certain piece of work reaches a certain position by the indexing movement, one dimension is checked and this is accomplished as the plate 30 moves downwardly. If the dimension is not satisfactory, the piece of work is discharged from the disc and depending upon the nature of the checking, this discharge may occur at the same position the work is checked in, or in a succeeding position. If the work passes the first check, succeeding checks are successively made, and if any one of them fails, the workpiece is discharged accordingly. A discharge tube is provided for each checking stage and consequently the several collections of failures will be grouped according to the nature of the defect. If the work is satisfactory, it is automatically discharged when it passes a final point near the load point. Hence, the machine constantly may be operated since the openings will be clear when they reach the loading point.

Referring to Fig. 1, the first check is one which checks the diameters 60 and 61 of the workpiece and this checking is done by means of a plunger gage 65 having its lower end provided with two diameters 66 and 67. This plunger passes upwardly through a sleeve 69 secured in the plate 30 and a spring within the sleeve and engaging a fixed bushing 70 therein at its upper end and a collar 71 on the pin at its lower end normally urges the plunger downwardly. Above the plate 30, a collar 72 is threaded on the pin so as to be adjustable vertically and this collar has a frustoconical wall 73 which is engageable with a roller 74 on a switch arm 75 forming part of a switch 76 carried by the plate.

The plate 62, underneath the disc 34, has a radial slot 78 extending inwardly underneath the plunger 65 and a shutter 79 is radially slidable in this slot. From this, it should be evident that as the shutter 79 is withdrawn radially the slot 78 is uncovered beneath the opening 35 in disc 34 and as a result the workpiece above it can fall. Beneath the plate 62, a secondary top 80 supports the plate 62 and this secondary top has an opening 82 in line with the inner end of the slot 78. Such opening is connected to a discharge tube 81 extending through the side wall 12 of the tube.

The shutter 79 is releasably connected as indicated at 84 to a bar 85 extending through a first solenoid 86 and beyond this solenoid the bar is connected to a second bar 87 extending through a second solenoid 88. The solenoid 86 is designed to pull the shutter 79 outwardly so as to uncover the reject or discharge opening in order that the workpiece may fall downward through the tube 81 while the solenoid 88 is designed to return the shutter to close the opening. For controlling the first solenoid 86, the switch 76 is located in the circuit of the solenoid by means of wires 90, 91 and 92 and when the switch is closed by the collar 72 the solenoid operates to open the shutter. The shutter is returned when a circuit through the solenoid 88 is closed by means of a normally closed switch 93 having a roller type arm 94. This switch is opened when the plate 30 is lowered and closes automatically when the plate is elevated. In the position shown by Fig. 1, the switch 93 is open but when the plate 30 is raised the spring arm moves slightly to the left and the switch automatically closes.

Assuming the workpiece is in the opening, as seen in Fig. 1, and the machine is operating, the plate 30 moves downwardly from an upper position and if the two diameters 66 and 67 move fully into the two diameters of the workpiece, the full movement of the plate 30 downwardly will not cause the collar 72 to move the switch operating roller 74. Hence, the solenoid 86 will not be energized and the shutter will remain in its closed position. However, if either diameter should not move downwardly into the respective diameter in the workpiece, downward movement of the plunger 65 will be arrested and then the continued movement of the plate 30 and switch 76 downwardly will cause the switch roller to move over the collar 72 so as to close the switch and thereby energize the solenoid 86. The shutter now will open and the workpiece will fall downwardly through the discharge tube 81. Therefore, with a satisfactory check, the workpiece will remain in position due to the fact that the shutter remains closed and hence will advance to the next position when the disc 34 indexes, but if the workpiece does not pass this first check, the piece will be rejected. Upon downward movement of the plate 30, the indexing of the disc 34 will occur so that the succeeding workpiece will be brought into position for the check described, while the checked piece will advance for a succeeding check, if it has passed the first check.

The succeeding check may consist in the checking of an outside diameter of the workpiece and the device for accomplishing this result is shown in Fig. 5. In this case, the plate 30 has a plunger 100 similar to that shown in Fig. 1, with the exception that its lower end has a tapered slot 101 into which a pin 102 projects. This pin is fixed to a rod or bar 103 which is slidably mounted in a block 104 fixed to the secondary top 80. At its inner end, the rod 103 has a reduced end 105 which is adapted to move through an opening 106 in the edge wall of the disc and contact the side of the workpiece. It should be understood in this connection that the edge wall of the disc and liner 36 at each hole in the disc has this transverse opening 106 so that the check shown by Fig. 5 can be made on each workpiece that reaches this position.

Solenoids 107 and 108, like the solenoids 86 and 88, are provided for opening and closing a shutter 109, respectively, and these solenoids are adapted to be energized by switches 110 and 111. With a workpiece in the opening, the plate 30 moves downwardly and due to the tapering slot 101, the rod 103 is shifted inwardly so as to move the end 105 against the workpiece. Now, if the diameter of the workpiece is too large, downward movement of the plunger 100 is arrested and then the continued downward movement of the plate 30 will cause the switch 110 to be closed and this in turn will energize the solenoid 107 so as to open the shutter 109. Then the discharged piece will fall downwardly through a second tube 112 which leads to another point outside the base. Upon upward movement of the plate 30 thereafter, the plunger 100 is retracted vertically and the rod 103 horizontally and the switch 111 closes so as to energize the solenoid 108 which closes the shutter 109. Therefore, if the piece is of too large a diameter, it is rejected and falls through the tube 112, but if it is not too large in diameter, the shutter remains closed, and the workpiece moves on to the next position when the disc moves.

It might be mentioned at this point, that the same device may be used for checking the same diameter so as to reject the piece if the diameter is too small. In this event, a switch 113 in the circuit of solenoid 107 would be closed by an element 114 on the plunger when the latter moves too far downwardly. In other words, if the diameter of the workpiece were too small, switch 113 would close and if too large, switch 110 would close.

In the next check, the size of the small opening 59 in the bottom of the workpiece may be checked. For accomplishing this result, the mechanism shown by Fig. 4 is provided. In this case, the plate 30 has a plunger 115 which is adapted to engage a vertically slidable pin 116 in the secondary top 80. The pin 116 is urged upwardly by means of a spring 117 so that it normally returns to its raised position when the plate 30 is elevated. One side of the pin 116 has rack teeth 119 and these engage teeth on a turnable pin 120 supported in the top 80. At the opposite side, the teeth on the pin 120 engage rack teeth 121 on a vertically slidable element 122 aligned vertically with the opening in the disc 34. At its upper end, the element 122 has a small gage pin 124 which is adapted to enter the opening 59 in the workpiece. Perhaps, it should be stated here that in at least one particular instance, the opening 59 might have a slight taper increasing to a larger diameter at its lower end which would require checking from beneath the workpiece instead of from above it. The device shown by Fig. 4 is for checking dimensions from beneath the workpiece and there are many instances where this would be required.

In view of the fact that the pieces checked at this stage from underneath cannot be discharged at the same location, means is provided to effect discharge at the succeeding station. For accomplishing this result, a switch operating bar 126 is provided on the plunger 115 and as the plunger moves sufficiently downwardly it closes a switch 127 which is in the circuit of a solenoid 128 located below the top 11. This solenoid is connected to a vertically movable pin 129 which is adapted to be moved upwardly into openings 130 in the disc 34. Within this opening 130 a short pin 131 is provided which may be held in either of two positions by means of a spring pressed ball 132 engageable with either of two notches 133 and 134 in the side of the pin. If the solenoid 128 is energized, it moves the pin 129 upwardly so as to throw the short pin 131 into a raised position.

Now, if the plunger 115 moves too far downwardly, resulting from the pin 124 moving too far upwardly into the opening 59 in the workpiece, the pin 131 will be thrown upwardly by energization of the solenoid. That is all that will occur at this stage. Upon raising of the plate 30, the solenoid is deenergized and the pin 129 is retracted either by gravity or by a spring that may be provided for this purpose. At the same time, the checking pin 122 will be retracted downwardly. Then the disc 34 will index to its next position carrying the workpiece with it.

Figures 2, 3:
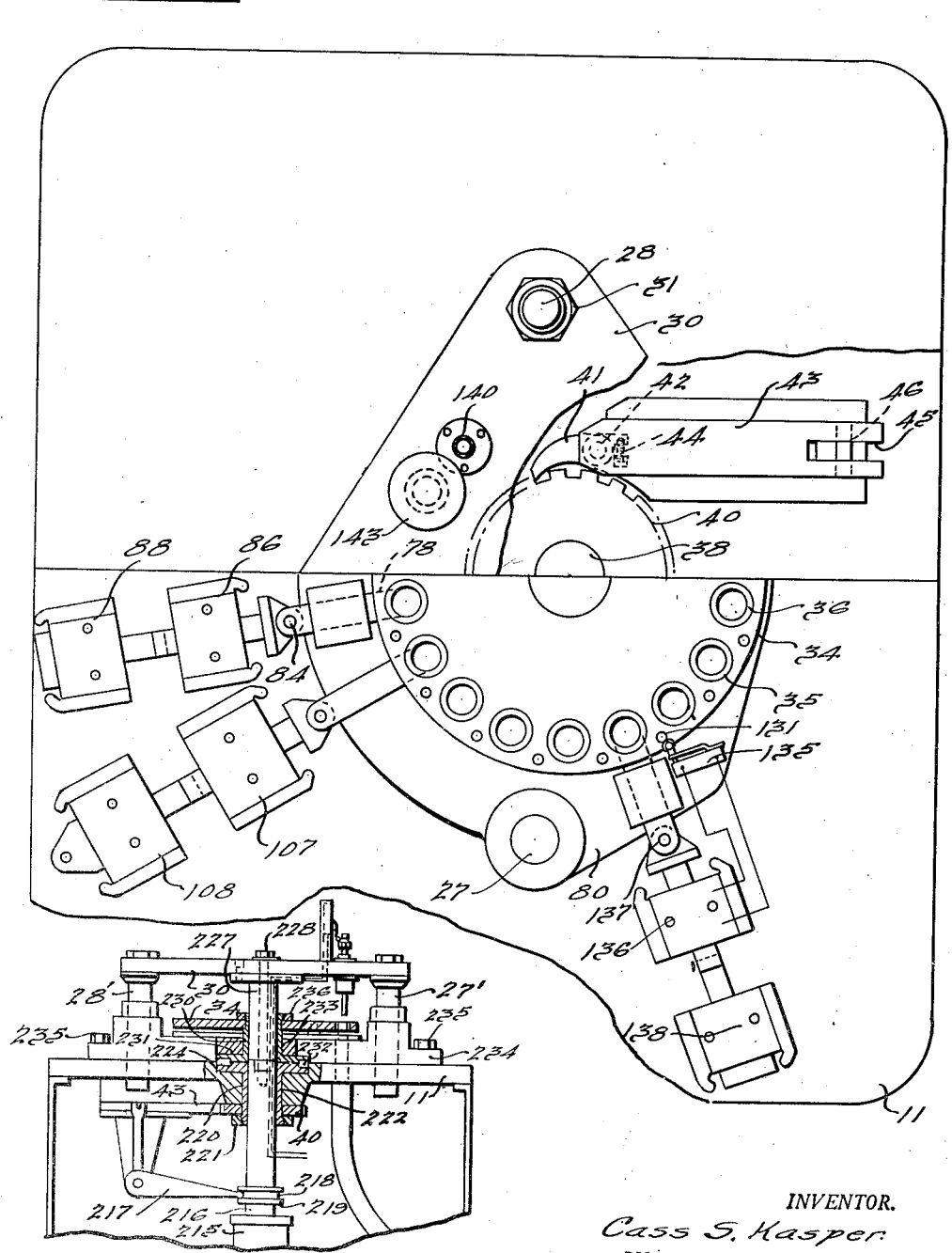
Fig. 2 is a fragmentary plan view of the mechanism shown by Fig. 1.
Fig. 3 is a fragmentary view on the order of that of Fig. 1 illustrating hydraulic means for actuating certain parts of the mechanism.

Discharge of the defective workpiece in the event the short pin 131 is thrown upwardly when opening 59 is too large, is effected by the raised pin 131 closing a switch 135 located on the top 80 as seen in Fig. 2. The switch is in the circuit of a solenoid 136 which is connected to a shutter 137 so as the disc indexes, the raised pin 131 will close the switch and open the shutter thereby allowing the rejected workpiece to discharge through a third tube to the exterior of the base. A pin 131 is provided for each workpiece opening and unless the pins are elevated the workpieces will not be rejected and hence are satisfactory in so far as the check on hole 59 is concerned. A solenoid 138 adjacent the solenoid 136 may be used to close the shutter 142 and such solenoid 138 may be energized by a switch such as the switches 111 and 93 which automatically close when the plate 30 again is elevated. It might be observed at this point that the pins may be returned automatically to their lower positions at any location beyond the shutter 137 merely by providing an abutment underneath which they must ride so as to be pressed downwardly again. It is evident that the device shown by Fig. 4 might be used for testing the depth of an opening in the bottom of the workpiece or for making any test where upward movement into the workpiece would determine whether or not the latter is satisfactory.

In the construction shown by Fig. 3, the same machine in general may be employed excepting that instead of using an electric motor for operating the machine, hydraulic means are employed. As illustrated, the base of the machine houses a cylinder 215 having a vertically reciprocatory piston or rod 216 secured to the plate 30 which may be elevated or lowered by flow of liquid under pressure either into the lower or upper end of the cylinder as the case may be. Indexing of the disc 34 may be effected in substantially the same manner as previously described, excepting that the bell crank for operating the pawl slide has an end 217 fitting in a groove 218 in a collar 219 fixed to the rod 216. Any suitable control apparatus may be used for effecting continuous reciprocation of the rod 216, as will be readily understood by those skilled in the art.

The indexing ratchet wheel in this case is also indicated at 40 and secured to the lower end of a sleeve element 220 by means of a nut 221 and such sleeve element is turnable in an opening 222 in the table top 11. At its upper end, the sleeve element 220 has a wide rim rotating in a recess 224 in the top and the upper surface of the rim is flush with the surface of said top. The rod 216 is made in two parts so as to provide a separation line at the top of the table and the upper part of the rod is indicated at 227 and is fastened to the lower part by a bolt 228.

A second sleeve element 230 having a rim 231 at its lower end is journaled on the rod portion 227 and for drivingly connecting the sleeve elements, keys 232 are employed between the rims on their adjacent ends. This second sleeve is journaled in a central opening 233 in a secondary top 234 secured by bolts 235 to the top 11 and at its upper end the sleeve element is drivingly connected to the disc 34. A nut 236 is threaded on the sleeve element above the disc. The sleeve element and disc are thereby retained assembled with the top 234 when it is removed from top 11. Opposite ends of the plate 30 are connected to vertical posts 27' and 28' which are slidable through openings in the two tops 11 and 234. It should now be evident that by removing bolts 235 and 228, the secondary top disc 34 and sleeve element 230, and the plate 30 may be removed as a unit from the top 11. It follows that units designed to operate on different types of pieces of work may be made and that one unit may be quickly substituted for another so that the machine can readily be changed to handle different work. More particularly, the discs 34 may have different types and sizes of openings for the work and the plate 30 may be equipped with appropriate checking devices. Discharge openings will of course be provided in the secondary top 234 to coincide with the discharge tubes 81 and connections such as the pins 84 on the shutter bars 79 are releasable so that the secondary top which carries the shutters may be engaged to and disengaged from the solenoids.

The same results may be accomplished in the motor driven unit shown by Fig. 1 by having the top 80, disc 34 and plate 30 removable as a unit and employing releasable connections where necessary in order to obtain the result of having units designed for different work and which may be substituted one for another merely by removing the secondary top, disc and upper plate.

The controls in the hydraulic arrangement for checking the dimensions of a workpiece and rejecting unsatisfactory pieces, etc., may be substantially as previously described and may thus be operated by solenoids. However, instead of using solenoids, fluid devices may be used for moving the shutter in reverse directions and the switches may be used for controlling solenoid valves that in turn would govern the flow of fluid to the fluid pressure device. In other words, in the machine shown by Fig. 3, the various movements may be effected by means of hydraulic devices instead of by solenoids and an electric motor.

Although more than one form of the invention has been illustrated and described in detail, it will be apparent to those skilled in the art that various modifications may be made without departing from the scope of the appended claims.

What is claimed is:

1. A workpiece checking machine comprising a frame having a top, a plate above the top having an opening for receiving individual pieces of work to be checked, a member above the plate and reciprocatory towards and from it, a movable gage element on the member for checking a diameter on the workpiece, means depending upon the movement of the gage element for denoting failure of the workpieces to meet a predetermined dimensional requirement, drive means below the top, means including a vertically reciprocatory post, extending through the top and plate operatively connecting the drive means to the member so that the latter may be reciprocated, said post being transversely divided intermediate its ends, means connecting the two ends of the post releasably together so that the upper part of the post may be removable with the reciprocatory member, and means releasably connecting the plate to the top.

2. A workpiece checking machine, comprising a frame having a fixed top, a secondary top releasably secured on the first top, said tops having coinciding central openings, a sleeve mounted in each opening, means on the adjacent ends of the sleeves releasably connecting them so that one sleeve may be driven by the other, a workpiece supporting-disk above the secondary top and secured to the sleeve therein, so that the disk will be rotated with the sleeve, means for turning the disk in the first top, a post extending upwardly through the two sleeves and above the disk, means for vertically reciprocating the post, and gage means carried by the upper end of the post and adapted to cooperate with workpieces on the disk.

3. In a workpiece checking machine, comprising a frame having a fixed top, a secondary top releasably secured on the first top, said tops having coinciding central openings, a sleeve in each of the openings, flanges on the adjacent ends of the sleeves having a cooperating drive engagement so that the upper sleeve may be driven by the lower sleeve, a work-supporting disk above the secondary top and secured to the upper end of the upper sleeve, a post extending upwardly through the two sleeves, gage means carried by the upper end of the post for testing workpieces on the disk, means for turning the disk, and means for reciprocating the post.

4. In a workpiece checking machine, comprising a frame having a fixed top, a secondary top releasably secured on the first top, said tops having coinciding central openings, a sleeve in each of the openings, flanges on the adjacent ends of the sleeves having a cooperating drive engagement so that the upper sleeve may be driven by the lower sleeve, a work-supporting disk above the secondary top and secured to the upper end of the sleeve, a post extending upwardly through the two sleeves, gage means carried by the upper end of the post for testing workpieces on the disk, means for turning the disk, means for reciprocating the post, said post being divided intermediate its ends so that the upper part of the post may be removed, and means releasably connecting the two parts of the post, whereby the secondary top, disk and upper part of the post may be readily removed as a unit.

CASS S. KASPER.

REFERENCES CITED

The following references are of record in the file of this patent:

UNITED STATES PATENTS

| Number | Name | Date |
|---|---|---|
| 1,367,191 | Leckie | Feb. 1, 1921 |
| 1,442,233 | Norton | Jan. 16, 1923 |
| 1,544,762 | King | July 7, 1925 |
| 1,676,879 | Wallin | July 10, 1928 |
| 1,758,268 | Wagner | May 13, 1930 |
| 1,771,097 | Raule | July 22, 1930 |
| 2,051,695 | Glacy | Aug. 18, 1936 |
| 2,116,926 | Cramer | May 10, 1938 |
| 2,186,693 | Bradbury | Jan. 9, 1940 |
| 2,382,885 | Landay | Aug. 14, 1945 |
| 2,393,246 | Hallowell | Jan. 22, 1946 |

FOREIGN PATENTS

| Number | Country | Date |
|---|---|---|
| 14,633 | Great Britain | of 1893 |